Patented Dec. 26, 1950

2,535,239

UNITED STATES PATENT OFFICE 2,535,239

CASTOR OIL-ORGANO SILICON REACTION PRODUCTS AND METHOD FOR THE PRODUCTION THEREOF

Frank J. Sowa, Cranford, N. J.

No Drawing. Application January 10, 1947, Serial No. 721,477

10 Claims. (Cl. 260—398)

This invention relates to useful products obtained by the reaction of castor oil and various organosilicon compounds, and to a method for the production thereof.

The objects of this invention are briefly as follows:
1. To prepare by the reaction of castor oil and certain classes of organosilicon compounds materials which are useful as lubricants, plasticizers, actuating fluids, etc.
2. To provide a method for the preparation of reaction products having the aforementioned properties.

These and other objects are accomplished in accordance with the method of this invention by contacting at reaction temperatures castor oil and an organosilicon compound having the generic formula $R_ySiX_z$, in which R is an alkyl radical, X is a halogen atom or an alkoxy group, $y$ is one or two, and $z$ is two or three, the fourth silicon valence, if not occupied by R or X, being occupied by a hydrogen atom.

The following examples illustrate the method for the preparation of several of the reaction products of this invention.

Example I 466.5 gms. of castor oil and 117.1 gms. of monoamyl triethoxysilane were heated to 160° C., and the heating was thereafter continued for about six hours. During this time, ethyl alcohol was formed and the temperature of the reaction mixture gradually dropped to 130° C. The contents of the flask were then cooled and again heated under reduced pressure, during which heating under reduced pressure 65 gms. of ethyl alcohol were collected in a Dry-Ice trap. The residue remaining in the reaction flask was a viscous oil which had good lubricating properties by itself or in conjunction with various solvents.

Example II 59 gms. of diethyl diethoxysilane and 732.8 gms. of castor oil were placed in a three-necked flask which was fitted with a thermometer, a stirrer, a fractionating column, a take-off head, and a reflux condenser. The flask and its contents were then heated to 170–174° C., and the vapor temperature rose to 85° C. when ethyl alcohol was liberated from the reaction mixture. When the maximum amount of alcohol had been liberated, the vapor temperature remained at 79° C. The flask was then cooled, and the alcohol was removed under a vacuum. The product remaining in the flask weighed 755 gms. (theoretical yield, 762 gms.), and had a Gardner-Holdt viscosity of 7.56 poises at 25° C. and a viscosity index of 110. The reaction product was compatible in all proportions with nitrocellulose and ethylcellulose solutions, and was a useful plasticizer for those film-forming materials.

Example III 59 gms. of diethyl diethoxysilane and 366.4 gms. of castor oil were placed in the same apparatus as was described in Example II, except that no fractionating column was used. The flask and its contents were heated to 170–175° C., and the vapor temperature dropped from 140 to 110° C. after a reflux period of 13 hours. After the ethyl alcohol had been removed by means of a vacuum, 385 gms. of material (theoretical yield, 395 gms.) remained in the flask. The reaction product had a Gardner-Holdt viscosity of 3.1 poises at 25° C. and a viscosity index of 122.7. This material, too, was compatible with ethylcellulose and nitrocellulose solutions, and was a useful plasticizer for those film-forming materials.

Example IV 59 gms. of diethyl diethoxysilane and 244 gms. of castor oil were placed in the apparatus described in Example II. The temperature of the ingredients in the flask was raised to 175° C., and the vapor temperature during refluxing dropped from 100 to 80° C. After cooling, the ethyl alcohol was removed by means of a vacuum. 260 gms. of product (theoretical, 273 gms.) remained in the reaction flask. The product had a Gardner-Holdt viscosity of 3.2 poises at 25° C. and had a viscosity index of 127.4. The material was compatible with nitrocellulose and ethylcellulose, and was a useful plasticizer for those materials.

Example V 117 gms. of monoamyl triethoxysilane and 549 gms. of castor oil were charged into the apparatus described in Example II. The flask temperature was held at 190° C., and the vapor temperature dropped from 106 to 83° C. after 6 hours of heating. After cooling, the ethyl alcohol was removed by means of a vacuum. 580 gms. of product were obtained (theoretical yield, 597.4 gms.). The product had a Gardner-Holdt viscosity of 23.8 at 25° C., and had a viscosity index of 132. This material, too, was compatible in all proportions with nitrocellulose and was a useful plasticizer therefor.

Example VI 550 gms. of castor oil were charged into a three-necked flask which was fitted with a dropping funnel, a stirrer, a condenser, and a receiver. From the dropping funnel 117.8 gms. of diethyl dichloro silane was added slowly to the castor oil at room temperature. After the addition of the silane had been completed, the temperature of the reaction mixture was slowly raised to 100° C. The time required for the addition of the silane and the subsequent heating of the reaction mixture was 11 hours, during which period of time the entire apparatus was operated under a slight vacuum and the exhausted gases were passed through a trap containing aqueous caustic soda. The oily reaction mixture remaining in the flask was acidic, and therefore in order to neutralize it the mixture was heated at 100° C. in contact with an excess of lithium carbonate until the product had been made neutral. The excess lithium carbonate and lithium chloride was then separated from the product by means of filtration to yield 520 gms. of material having a Gardner-Holdt viscosity at 25° C. of 11.9 poises. The reaction product was compatible with nitrocellulose and ethyl cellulose solutions, and was a useful plasticizer for these film formers.

Example VII 249 gms. of monolauryl triethoxy silane and 825 gms. of castor oil were charged into a three-necked flask which was fitted with a stirrer, a 12-inch fractionating column, a take-off head, and a condenser. The mixture was heated with stirring and ethyl alcohol was gradually distilled off while the temperature of the mixture in the flask was not permitted to rise above 180° C. The final traces of alcohol were then removed by the application of a vacuum. This procedure required 12½ hours, and yielded 1011 gms. of product having a Gardner-Holdt viscosity at 26° C. of 11.3 poises. The material thus produced was useful as a lubricant and also as a plasticizer for nitrocellulose and ethyl cellulose.

Each of the products prepared in Examples II–VII was oily in character and was useful as a lubricant. These materials were valuable plasticizers for nitrocellulose because of their high viscosity index, as indicated in the table below:

| Ex. No. | Silane | Molar Ratio C. O. : Silane | Viscosity in Centistokes | | | Index (Viscosity) |
|---|---|---|---|---|---|---|
| | | | 25° C. | 37° C. | 97° C | |
| II | Diethyl diethoxy | 1 : 0.5 | 678.4 | 327.1 | 27.19 | 110 |
| III | ....do.... | 1 : 1 | 289.5 | 140.1 | 16.46 | 122.7 |
| IV | ....do.... | 1 : 1.5 | 308.2 | 146.9 | 17.66 | 127.4 |
| V | Monoamyl triethoxy | 1 : 1 | 3072 | 1493 | 137 | 132 |
| VI | Diethyl dichloro | 1 : 1.5 | 1415 | 607.2 | 51.22 | 118.9 |
| VII | Monolauryl triethoxy | 1 : 1 | 1359 | 605 | 48.1 | 119 |
| | Castor Oil (C. O.) | 1 : 0 | 756 | 388 | 22.57 | 72.3 |

The foregoing examples illustrate the method of this invention for the preparation of castor oil-organosilicon reaction products by contacting at reaction temperatures castor oil and an organosilicon compound having two or three replaceable halogen or alkoxy groups attached directly to the silicon atom. The reaction between the halogen-substituted silicanes and the castor oil is a condensation with the loss of hydrogen halide, while the reaction between the alkoxy-substituted silicane and the castor oil is a condensation with the loss of alcohol. Depending upon the particular vapor pressure characteristics of the organosilicon compound employed as a reactant, the reaction may be carried out at atmospheric pressure, as shown in the examples, or at superatmospheric pressure when it is desired to limit the escape of an organosilicon compound of high vapor pressure from the reaction zone before the reaction has been completed. Furthermore, depending upon the particular organosilicon compound selected, the reaction may initiate spontaneously, or it may be initiated by means of mild heating, as is shown in the examples.

For the organosilicon compounds used as a reactant in the examples, there may be substituted any compound of the class $R_ySiX_z$, in which R is an alkyl radical, X is a halogen (e. g., fluorine, chlorine, or bromine) or an OR' group (R' being an alkyl radical), $y$ is one or two, and $z$ is two or three, the remainder of the four silicon valences, if any, being occupied by hydrogen. Thus, among the organosilicon compounds which may suitably be employed as a reactant are n-amyl dichlorsilicane, n-amyl dimethoxysilicane, n-amyl trichlorosilicane, di-n-amyl dichlorsilicane, n-amyl triethoxy silicane, methyl trifluorosilane, dimethyl difluorosilane, ethyl tribromosilane, diethyl dibromosilane, n-propyl tri-n-butoxysilane, di-n-propyl di-n-butoxysilane, etc. Preferably, R is an alkyl group having from one to five carbon atoms, such as the methyl, ethyl, n-propyl, i-propyl, n-butyl, n-amyl, etc. radicals, and R' is the methyl or ethyl group. Preferably, also, 0.3–1.0 equivalents of the organosilicon compound are employed per equivalent of castor oil, based upon the hydroxyl content thereof.

Depending upon the particular reactants selected and their relative proportions, and also upon the extent to which the reaction is carried towards completion, the products of this invention are liquids of varying viscosity. The materials are completely compatible with cellulose derivatives, such as nitrocellulose and ethylcellulose, and are particularly valuable plasticizers therefor because of their stability and viscosity index, which is particularly high considering the amount of silicon in the products. All the products, furthermore, are characterized by their substantially oily nature, and this property, combined with the property of high viscosity index, makes them valuable lubricants. The reaction products disclosed herein, when of low viscosity, may be used as such as hydraulic fluids; when of high viscosity they may be used as hydraulic fluids when in solution in various solvents, such as acetone, methyl ethyl ketone, fusel oil, isobutyl alcohol, and the monobutyl ether of ethylene glycol.

This application is a continuation-in-part of my abandoned application Serial No. 337,833, filed May 29, 1940, and entitled "Silicon Compounds and Method of Making the Same."

I claim:

1. A reaction product of castor oil and an organosilicon compound of the class $R_ySiX_z$, in which R is an alkyl radical, X is a radical selected from the group consisting of halides and alkoxy radicals, $y$ is an integer from one to two, and $z$ is an integer from two to three, the fourth silicon valence, if not occupied by R or X, being occupied by hydrogen.

2. A reaction product of castor oil and an organosilicon compound of the class $R_2SiX_2$, in which R is an alkyl radical and X is a material selected from the group consisting of halides and alkoxy radicals.

3. A reaction product of castor oil and an organosilicon compound of the class $RSiX_3$, in which R is an alkyl radical and X is a material selected from the group consisting of halides and alkoxy radicals.

4. A reaction product of castor oil and an organosilicon compound of the class $R_2SiX_2$, in which R is an alkyl radical and X is a halogen atom.

5. A reaction product of castor oil and an organosilicon compound of the class $R_2SiX_2$, in which R is an alkyl radical and X is an alkoxy radical.

6. A reaction product of castor oil and an organosilicon compound of the class $R_2SiX_2$, in which R is an alkyl radical having from one to five carbon atoms and X is a halogen atom.

7. A reaction product of castor oil and an organosilicon compound of the class $R_2SiX_2$, in which R is an alkyl radical having from one to five carbon atoms and X is an alkoxy radical having from one to two carbon atoms.

8. A reaction product of castor oil and an organosilicon compound of the class $RSiX_3$, in which R is an alkyl radical having from one to five carbon atoms and X is a radical selected from the group consisting of halides and alkoxy radicals having from one to two carbon atoms.

9. A reaction product of castor oil and an organosilicon compound of the class $R_2SiCl_2$, in which R is an alkyl radical having from one to five carbon atoms.

10. The method of preparing a reaction product of castor oil and an organosilicon compound of the class $R_ySiX_z$, which comprises contacting at reaction temperatures castor oil and an organosilicon compound of the class $R_ySiX_z$, in which R is an alkyl radical, X is a radical selected from the group consisting of halides and alkoxy radicals, $y$ is an integer from one to two, and $z$ is an integer from two to three, the fourth silicon valence, if not occupied by R or X, being occupied by hydrogen.

FRANK J. SOWA.

REFERENCES CITED

The following references are of record in the file of this patent:

UNITED STATES PATENTS

| Number | Name | Date |
|---|---|---|
| 1,918,338 | Kaufmann | July 18, 1933 |
| 2,048,799 | Lawson | July 28, 1936 |
| 2,182,208 | Nason | Dec. 5, 1939 |
| 2,270,352 | Sowa | Jan. 20, 1942 |

FOREIGN PATENTS

| Number | Country | Date |
|---|---|---|
| 450,875 | Great Britain | July 27, 1936 |